N. G. GOREAU.
WATER HEATER.
APPLICATION FILED OCT. 16, 1914.

1,303,054.

Patented May 6, 1919.

Witnesses
Floyd R. Cornwall.

Inventor
Nelson G. Goreau
By
Attorney

UNITED STATES PATENT OFFICE.

NELSON G. GOREAU, OF NEW ORLEANS, LOUISIANA.

WATER-HEATER.

1,303,054.

Specification of Letters Patent.

Patented May 6, 1919.

Application filed October 16, 1914. Serial No. 866,917.

*To all whom it may concern:*

Be it known that I, NELSON G. GOREAU, a citizen of the United States, residing at New Orleans, Louisiana, have invented a new and Improved Water-Heater, of which the following is a specification.

My invention relates to water heaters and particularly to devices of this general character in which the water is heated by gas that is automatically turned on by the flow of water caused by opening a faucet at any point on the discharge side of the system and in which the gas is automatically turned off when all the faucets are closed.

The object of my invention is to provide an improved and efficient valve mechanism for use in connection with water heaters of the general character above indicated which shall automatically control the flow of water and gas in such a manner as to insure a supply of water of substantially uniform temperature, and further to provide means whereby the fuel supply valve will be closed if the normal closing means fails to act.

Another object is to control the temperature of the heated water primarily by controlling the amount of water flow, the mechanism being arranged, however, so that if temperature becomes excessive at any time gas will be cut off. Ordinarily, however, the control of the amount of flow enables the proper temperature of water to be maintained without affecting the gas supply, and this results in great economy compared with other mechanism in which the thermostatic control acts primarily through the gas supply, and in which there is a lack of economy due to the fact that before the thermostat acts to cut off the gas, sufficient gas has already been burned to raise the temperature of the water through a considerable range. Another object is to compensate for wide variations in the initial temperature of water occurring for instance in summer and winter, so that in spite of these initial variations the heated water will be delivered at a proper temperature, and this will be accomplished by a primary control of the amount of water flow, as above described. Another object is to provide, in a simple combined device intermediate the thermostat and the pressure motor for operating the gas valve, a check valve to insure positive closing of the gas valve in certain cases, a by-pass to equalize pressures on the two sides of the motor device in certain cases, means for applying resistance to the flow to create differential pressures in the motor, means for regulating the normal amount of flow, and means for varying the amount of heated water before the thermostat acts to control the gas supply.

My invention has for a further object the provision of various forms of simple and reliable means for effecting the above objects.

Certain embodiments of the invention are illustrated in the accompanying drawing, wherein—

Broadly stated, the function of these valve structures is to provide a high and a low pressure chamber in the supply and discharge conduit, to provide means for connecting said high and low pressure chambers, equivalent to a by-pass for equalizing pressure in the chambers in certain cases, and to provide a flow limiting means, a thermostat to control or equalize the pressures in said chambers, and a check valve whereby the fluid in the heater will exert a pressure on the reverse side of the diaphragm, which will force the gas valve to its seat, should the spring which normally effects the closing of this valve fail to act.

Figure 1:
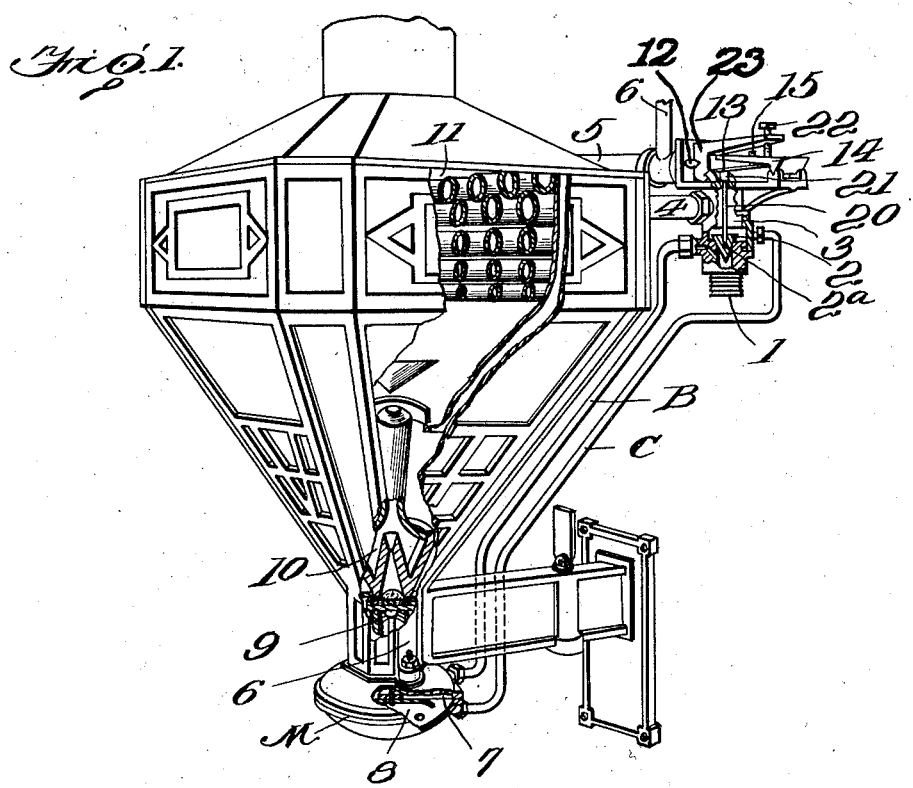
Figure 1 is a perspective, part-sectional view of an automatic water heater provided with a valve mechanism in accordance with my invention.

Referring first to Fig. 1, water enters the apparatus at 1, and encounters the resistance valve member 2, which creates differential pressure between supply pipe 1 and discharge chamber 3, which leads to the heating coil by way of connection 4. When the fluid is heated it returns to thermostatic chamber 5, thence to pipe 6 which is the pipe line leading to various hot water faucets. There is a connection B leading to high pressure chamber 7 and a connection C from low pressure chamber 8 to the low pressure side of resistance device 2. When a faucet on the outlet 6 is opened the pressure in the conduits is unbalanced. Consequently, the pressure in chamber 8 being reduced, the higher pressure in chamber 7 overcomes the tension of spring 9 and pulls the gas valve away from its seat, permitting a flow of gas to the burner 10. The water flows through the heating coil 11, which connects to inlet 4 and outlet 5. This affects the thermostat 12 and tends to relieve the tension on the resistance spring 13, thereby tending to equalize the pressure on both sides of resistance member 2 and also permits more water to flow past resistance member 2. This increased flow tends to reduce the temperature of the water flowing through the heating coil. Should the faucet on the outlet not allow this additional water to escape freely, then the pressure will equalize on both sides of the resistance member and the spring 9 will force the gas valve to its seat.

In the structure of Fig. 1 a connector or stem 20 is placed intermediate the thermostatic lever 14 and the resistance member 2. This stem enters a hole in the top of the resistance member and the clearance or lost motion space $2^a$ is provided between the stem and the valve to permit the valve to move upward slightly without resistance to water flow. This permits the slight flow of water past the valve due to leaky faucets in the house service line without actuating the gas valve and also to equalize pressure in the chambers after the faucets are closed. At the top, the stem 20 has an enlarged head 21 which rests against the top of the casing of chamber 3. The downward movement of the stem is thus limited and a fixed clearance or lost motion between the stem and the valve 2 is provided. In this embodiment of the invention the resistance spring 13 is connected at one end to the thermostat lever 14 and the other end of the spring rests on the head 21 of stem 20 to apply yielding resistance to valve 2 after the valve has opened very slightly and taken up the lost motion between it and the stem. The tension of the spring is regulated by a screw 15 passing through lever 14. The spring 13 will apply a yielding resistance to valve 2 as soon as the clearance is taken up, and this yielding resistance will continue permitting the valve to open farther as the house faucet is opened until the desired limit of flow is reached, whereupon the end of spring 13 will engage the lever 14 and the fixed resistance is then opposed to water flow; that is, this resistance is subject only to variations caused by the action of the thermostat lever 14 as effected by movements of the thermostat due to temperature. The desired normal flow limit, say three or four gallons per minute for example, is regulated by screw 22 passing through thermostat lever 23 and engaging lever 14.

Suppose that the water supply is at a medium temperature, say 60 degrees, spring 13 is adjusted for suitable resistance to actuate the motor M and lever 14 is adjusted by screw 22 to limit the normal flow of water to say three gallons per minute. When a house faucet in the pipe 6 is opened, water will flow through pipe 1 and valve 2 is raised until the slight clearance between it and stem 20 is taken up. Resistance will then be applied to water flow by spring 13, stem 20, and valve 2, creating a higher pressure in pipe B and causing the actuation of motor M and the gas valve, and the main burner is lighted by its pilot. The valve and stem 20 rise against the resistance of the spring until the end of the spring encounters lever 14, and the water flow is then limited to the indicated amount of three gallons per minute with a constant resistance. Water passes through chamber 3, pipe 4, coil 11 and pipe 5, which contains the thermostatic elements, and so through pipe 6 to the faucet. As the water heats, at a certain point, pressure on lever 23 by stem 12 of the thermostatic element will be relaxed, somewhat relieving pressure on lever 14, and valve 2 will then rise somewhat, permitting a slightly greater flow of water, which, with the same maximum heat supply, will reduce temperature to the required degree without, however, causing any actuation of the gas valve. When the temperature falls below the required amount, due to the increased water flow, increased pressure is applied to the thermostat levers and the normal position of lever 14 is restored and normal resistance is applied to the water flow, cutting it down to the indicated amount of three gallons per minute. It will thus be seen that the ordinary and normal control afforded by the stem is the control of the amount of water flow, and the temperature of the heated water can thus be kept within close limits without ordinarily affecting the gas valve at all after the service faucet is once opened until the faucet is closed again. At any time, if for any reason the temperature of the heated water should rise to an abnormal degree, the thermostat will retract the lever 14 sufficiently to relieve pressure on the valve 2 to such an extent that pressure in the motor M will be equalized and spring 9 will shut the gas valve.

With the same setting of the controlling mechanism if the temperature of the water supply is lower or higher, evidently the thermostat will locate lever 14 properly to apply the required fixed resistance to water flow, so that the normal flow will be increased or decreased sufficiently to provide the proper temperature of the heated water.

Figure 2:
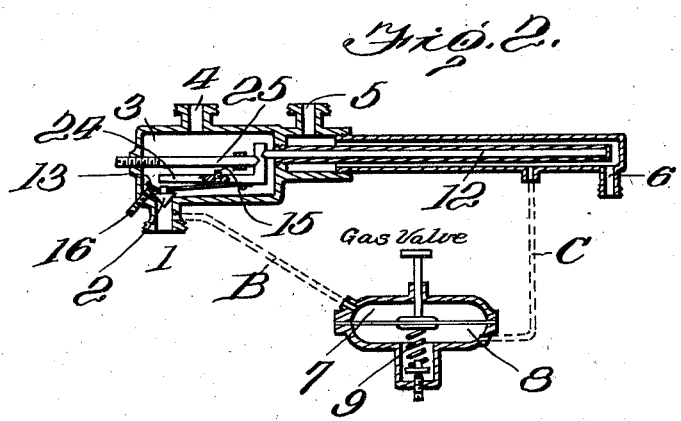
Fig. 2 is a sectional view of a modified valve mechanism embodying the same general principles as Fig. 1.

In Fig. 2 the specific arrangement of the mechanism is different but the same principles are involved. A single thermostatic lever 24 is provided, and this is adjusted by a screw 25. The resistance of spring 13 and its connection with the thermostat lever and its adjustment by means of screw 15 are substantially the same as in Fig. 1. But the lost motion for the resistance valve 2 is provided by means of an adjustable stop screw 16 arranged to engage the end of spring 13 so that the spring may be held away from the upper side of valve 2 slightly, more or less, to permit the desired free movement of the valve before it encounters the spring for the purpose previously described. The construction and operation of the form of invention shown in Fig. 2 will otherwise be clearly understood from a description of Fig. 1. It may be noted, however, that in Fig. 2 any element similar to the connecting stem 20 of Fig. 1 is eliminated.

It is to be especially noted that the resistance member is opposed by spring 13, which is regulated to permit a limited amount of water to flow past the resistance (say three gallons). Now, if the temperature rises above normal, the thermostatic lever 14 will decrease the resistance and permit additional water to flow past resistance 2. The adjusting screw 15, is adjusted so that spring 13 is held slightly out of contact with resistance check valve 2. The object of this is to permit water to transfer from chamber 7 to chamber 8, by way of said resistance check valve 2. Further, this resistance member 2 being independent of spring 13 and operating lever 14 of the thermostatic apparatus, acts as a check valve and permits the water to be trapped under pressure in the heating coil. This pressure is communicated to chamber 8, thereby forcing the gas valve to its seat. Water in chamber 7 will be permitted to flow out into the street main through pipe 1.

The tension of resistance spring 13, is adjusted by regulating screw 15.

An important feature of the invention is the provision of a gas valve which seats in the direction of flow of gas, this arrangement in addition to the spring insuring a very positive closing of the valve. Another important feature is the arrangement of the water valve and resistance device and the thermostat in a convenient location at one part of the heater and the arrangement of the gas valve with its actuating diaphragm at another convenient part of the heater with hydraulic connections between the water valve and the diaphragm to actuate the latter. This arrangement eliminates much mechanical complication, while the means employed for applying hydraulic pressure to actuate the gas valves insures the desired close regulation, positive action, and especially the positive closing of the gas valve after spigots in the house service line have been closed, if for any reason the gas valve should tend to stick open. A further object is the very simple provision of a positively acting check valve to insure the closing of the gas valve, this being accomplished by combining the check valve with the water flow resistance device in a very simple and effective way.

I claim:—

1. In an automatic water heater, the combination with the heating coil, water supply pipe, gas valve, pressure motor for actuating said valve, and thermostat, of a combined water-flow-resistance device and check-valve acting on the incoming water, and means to connect the thermostat operatively with said device, said means including means to permit a limited amount of water to pass said device without resistance, and connections from high and low pressure sides of the resistance device to corresponding sides of the motor.

2. In an automatic water heater, the combination with the heating coil, water supply pipe, gas valve, pressure motor for actuating said valve, and thermostat, of a combined water-flow-resistance device and check-valve acting on incoming water, and means to connect the thermostat operatively with said device, said means including lost motion means to permit limited opening of the resistance device without resistance to incoming water, and connections from high and low pressure sides of the resistance device to corresponding sides of the motor.

3. In an automatic water heater, the combination with the heating coil, water supply pipe, gas valve, operating motor for said valve, and thermostat, of a resistance device opposed to the incoming water, a spring to apply yielding resistance to said device, and means actuated by the thermostat to limit the opening movement of the resistance device, said limiting means being positioned by the thermostat in accordance with temperature of the heated water to control temperature primarily by varying the amount of water flow into the device, and connections from high and low pressure sides of the resistance device to corresponding sides of the motor.

4. In an automatic water heater, the combination with a heating coil, water supply pipe, gas valve, motor for said valve, and thermostat, of a combined water-flow-resistance device and check-valve acting on incoming water, means to connect the thermostat operatively with said device, said means including lost motion means to permit limited opening of the resistance device without resistance to incoming water, and a spring to apply yielding resistance to said device, and connections from high and low pressure sides of the resistance device to corresponding sides of the motor.

5. In an automatic water heater, the combination with a heating coil, water supply pipe, thermostat, and burner, of a combined resistance and check valve acting against the water supply, an operative connection between the thermostat and check valve, said connection including lost motion means, said valve and related parts serving to apply resistance to normal water flow to create differential pressures, to permit moderate flow without resistance, to equalize pressures when service faucets are closed and to trap water in the coil circuit to provide pressure to positively close the gas valve in certain cases, a gas valve for the burner, a motor for the gas valve, and water connections from high and low pressure sides of the first named valve to corresponding sides of the motor.

6. In an automatic water heater, the combination with a heating coil, water supply pipe, thermostat, and burner, of a combined resistance and check valve acting against the water supply, an operative connection between the thermostat and said valve, said connection including lost motion means, and a spring arranged to apply resistance to said valve to create differential pressures after the valve has opened sufficiently to take up lost motion, said valve and related parts serving to apply resistance to normal water flow to create differential pressures, to permit moderate flow without resistance, to equalize pressures when service faucets are closed and to trap water in the coil circuit to provide pressure to positively close the gas valve in certain cases, a gas valve for the burner, a motor for said gas valve, and water conduits leading from high and low pressure sides of the first named valve to corresponding sides of said motor.

7. In an automatic water heater, the combination with a heating coil, water supply pipe, thermostat, gas burner, gas valve and pressure motor for the valve, of a resistance member opposed to incoming water, a stem intermediate the thermostat and said member, the stem being constructed and arranged to supply lost motion for said member, means for applying yielding resistance to the stem after the lost motion is taken up in the opening movement of the resistance member, and a regulating member intermediate the thermostat and the stem serving to limit through the stem the opening movement of the resistance member, said regulating member being positioned by the thermostat to regulate temperature of the heated water primarily by controlling the amount of water flow, and connections from high and low pressure sides of the resistance member to corresponding sides of the motor.

8. Same as claim 1, with the addition of means for varying the amount of water which may pass said resistance device without resistance.

9. Same as claim 2, with the addition of means to adjust said lost motion means to vary the amount of opening of the resistance device without resistance to incoming water.

10. Same as claim 3, with the addition of means to adjust said limiting means to vary the normal amount of water flow.

11. Same as claim 5, with the addition of means to adjust said lost motion means to vary the amount of water that may pass the resistance valve without resistance.

12. Same as claim 6, with the addition of means to adjust said spring to vary the resistance applied to the valve.

13. In an automatic water heater, the combination with a heating coil, water supply pipe, gas valve and motor for the valve, of a combined water-flow-resistance device and check-valve acting on incoming water, means for applying yielding resistance to the valve, means for permitting limited movement of the valve without resistance, and means for limiting the opening movement of the valve to regulate the normal amount of water passing through the system, and connections from high and low pressure sides of the resistance device to corresponding sides of the motor.

14. Same as claim 13 with the addition of means for adjusting the limiting means to vary the normal amount of water flow.

15. Same as claim 13, with the addition of means for varying the amount of limited movement of the valve without resistance.

NELSON G. GOREAU.

Witnesses:
  H. W. HILLS,
  A. W. GOREAU.